(12) United States Patent
Kesselman et al.

(10) Patent No.: US 7,485,253 B2
(45) Date of Patent: Feb. 3, 2009

(54) IN-MOLD FINISHED NECK ON A CONTINUOUS EXTRUSION BLOW MOLDER

(75) Inventors: David A. Kesselman, York, PA (US); Roy N. Krohn, Wrightsville, PA (US); Bob Stoolmaker, York, PA (US); John A. Garman, Spring Grove, PA (US)

(73) Assignee: Graham Packaging Company, L.P., York, PA (US)

( * ) Notice: Subject to any disclaimer, the term of this patent is extended or adjusted under 35 U.S.C. 154(b) by 285 days.

(21) Appl. No.: 11/435,937

(22) Filed: May 18, 2006

(65) Prior Publication Data

US 2006/0257520 A1  Nov. 16, 2006

Related U.S. Application Data

(63) Continuation-in-part of application No. 11/125,112, filed on May 10, 2005.

(51) Int. Cl.
*B29C 49/36* (2006.01)
*B29C 49/50* (2006.01)

(52) U.S. Cl. ............... 264/536; 264/543; 425/525; 425/531; 425/535; 425/540

(58) Field of Classification Search ............... 425/525, 425/531, 535, 540; 264/536, 542, 543; *B29C 49/36, B29C 49/50*
See application file for complete search history.

(56) References Cited

U.S. PATENT DOCUMENTS

| | | | | |
|---|---|---|---|---|
| 2,858,564 A | * | 11/1958 | Sherman et al. | 264/543 |
| 3,081,489 A | * | 3/1963 | Jackson et al. | 425/531 |
| 3,466,702 A | * | 9/1969 | Stenger | 425/531 |
| 3,585,683 A | * | 6/1971 | Wilson | 425/525 |
| 3,752,628 A | * | 8/1973 | Hafele et al. | 425/531 |
| 4,143,453 A | * | 3/1979 | Taluba | 425/525 |
| 4,753,591 A | * | 6/1988 | Maes et al. | 425/525 |

FOREIGN PATENT DOCUMENTS

GB   1395727 A   *  5/1975

* cited by examiner

*Primary Examiner*—Robert B Davis
(74) *Attorney, Agent, or Firm*—Knoble, Yoshida & Dunleavy, LLC

(57) ABSTRACT

The invention provides a mold for use in a wheel blow-molding device. The mold has a first half and a second half, each half having a rotation direction and a transverse direction perpendicular to the rotation direction, each half having a container-shaped cavity, adapted to receive a parison, wherein the cavity has a body portion and a neck portion; and a blow pin tip disposed in the mold, adapted to be inserted into an open end of the parison in the neck portion of the cavity, the blow pin tip being adapted to blow a gas into the parison to blow mold a container.

20 Claims, 2 Drawing Sheets

IN-MOLD FINISHED NECK ON A CONTINUOUS EXTRUSION BLOW MOLDER

RELATED APPLICATIONS

The present invention is a continuation-in-part of U.S. application Ser. No. 11/125,112, filed May 10, 2005, entitled "Method of Scrap Reduction in a Mold," the contents of which are herein incorporated by reference in their entirety.

BACKGROUND OF THE INVENTION

1. Field of the Invention

The present invention relates generally to molds for upwardly extruding blow molding machines, and more particularly to producing containers with finished necks in upwardly extruding blow molding machines.

2. Related Art

Upwardly extruding blow molding machines, also known as wheel blow molding devices, typically have a series of molds arranged on a wheel revolving around a central pivot. As an empty mold approaches an extruded parison, it closes around the parison, pinching off or cutting the parison. Once the mold is closed, a blow needle is inserted into the mold to inflate the parison into the mold. As the mold continues to revolve around the pivot, the product in the mold cools and hardens, and falls out when the mold opens. The process repeats for the series of molds arranged on the wheel.

Containers produced in conventional upwardly extruding blow molding machines require post-molding procedures, such as reaming, to finish the neck portion. Such post-mold processes require additional equipment, more time and more money to produce a container that is ready for use.

What is needed is a way to produce a container with a finished neck in a wheel blow molding machine that overcomes shortcomings of conventional solutions.

BRIEF SUMMARY OF THE INVENTION

In summary, the present invention, in an exemplary embodiment, provides a mold for use in a wheel blow molding machine that produces a container with a finished neck. The mold may include a blow cylinder in the body of the mold.

Particular embodiments of the invention provide a mold for use in a wheel blow-molding device. The mold has a first half and a second half, each half having a rotation direction and a transverse direction perpendicular to the rotation direction, each half having a container-shaped cavity, adapted to receive a parison, wherein the cavity has a body portion and a neck portion; and a blow pin tip disposed in the mold, adapted to be inserted into an open end of the parison in the neck portion of the cavity, the blow pin tip being adapted to blow a gas into the parison to blow mold a container.

Other embodiments of the invention provide a method of molding a container in a wheel blow-molding device. The method includes closing a mold around an extruded parison. The mold has a first half and a second half, each half having a rotation direction and a transverse direction perpendicular to the rotation direction, each half having a container-shaped cavity, adapted to receive a parison, wherein the cavity has a body portion and a neck portion; and a blow pin tip disposed in the mold. The method also includes inserting the blow pin tip into an open end of the parison in the neck portion of the cavity; and blowing a gas into the parison with the blow pin tip.

Further objectives and advantages, as well as the structure and function of preferred embodiments will become apparent from a consideration of the description, drawings, and examples.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention. All references cited herein are incorporated by reference as if each had been individually incorporated.

This invention may produce a container, such as a Polyolefin bottle, with a finished neck. A finished neck is a neck which does not require any post mold operation to produce either the specified "C" dimension, i.e., the inside diameter at the top of the bottle, or the specified "H" dimension, i.e., the top of the finish is substantially flat and perpendicular to the center line of the neck.

Embodiments of the mold may be used in conjunction with the method and apparatus disclosed in U.S. application Ser. No. 11/125,112. In that method, an upwardly extruded parison is cut off with the use of the head tooling. The parison programmer makes it possible to cut a parison for each mold at precisely the correct moment, to have a new start of a parison be long enough to be captured by the next mold, and to generate a space in the parison so that the cavity in the mold may capture the parison at the correct length.

Figure 1:
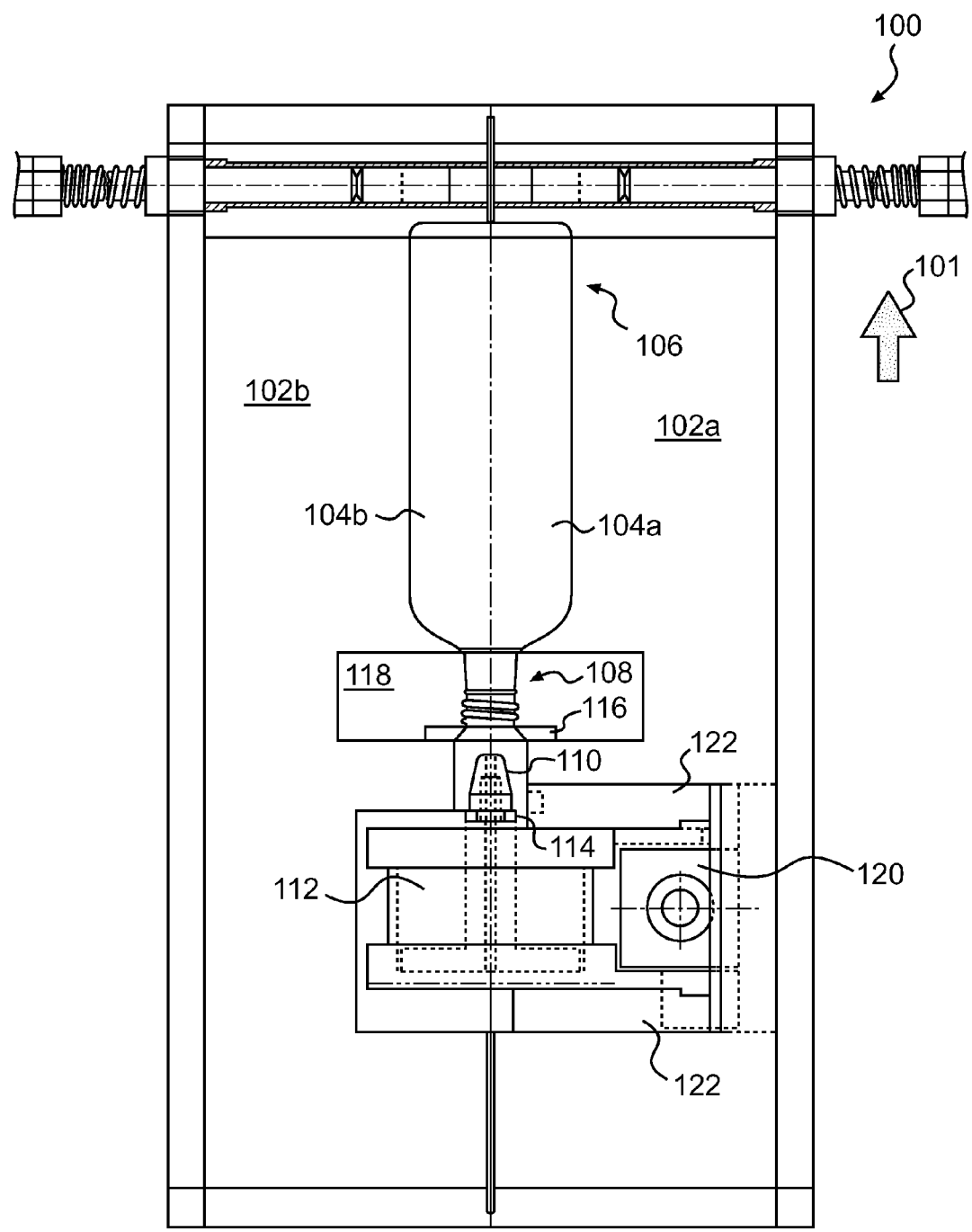
FIG. 1 depicts an exemplary embodiment of a mold according to the present invention.

An exemplary embodiment of a mold 100 according to the present invention is depicted in FIG. 1. The direction of rotation 101 of the mold is indicated by the arrow. The mold comprises two mold halves, 102a, and 102b (collectively 102). Each mold half 102a, 102b may include a cavity 104a, 104b, respectively (collectively 104). When the mold halves 102 are closed together, the cavity 104 formed may be container-shaped and may contain the parison to be blow-molded into the shape of the container cavity 104. The bottom region 106 of the cavity 104, which corresponds to the bottom of the container, may be disposed at the leading end of the mold, i.e. the front end with respect to the direction of rotation of the mold on the wheel blow molding device. A neck portion 108 of the cavity 104, which corresponds to the neck of the container, may be disposed toward the middle or the opposite end of the mold 100 from the bottom of the container. When the cavity 104 contains a parison, the top of the parison may be pinched closed at the bottom region 106, while the bottom of the parison may remain open in the neck region 108 of the cavity 104.

The mold halves 102 further include space capable of housing a blow pin tip 110, a blow air cylinder 112 and a cutting ring 114. The blow pin tip 110, when in the mold 100, may be inserted into the open end of the parison in the neck region 108.

When the air cylinder 112 is activated, the blow air cylinder 112 may push the blowpin tip 110 with the cutting ring 114 into the open end of the parison. The cutting ring 114 may engage a striker plate 116, which may be mounted to the top of a neck insert 118, with sufficient force and velocity to form the top of the neck and, at the same time, separate the neck from any small amount of flash formed above the neck.

The container may be blown with the same air that drives blow air cylinder 112 forward, or the blow air may be supplied by an additional air circuit. A second air cylinder 120 may be used to transport the blow air cylinder 112 precisely into the blowing position. The movement of the blow air cylinder 112 may be achieved by the use of guiding gibs, e.g., 122, disposed on three sides of the blow air cylinder 112 and by the mounting of the transport air cylinder 120. The blow air cylinder 112 may be mounted in either half of the mold 100, or externally to the mold, for example, toward the center support of the blow molding wheel.

In an exemplary embodiment, the blowpin tip 110 and cutter ring 114 may produce the specified "C" and "H" dimensions for the neck. The blow air cylinder 112 which delivers the blowpin tip 110 to the parison may be transported into position by another air cylinder, such as air cylinder 120, or it may be stationary. The blowpin tip 100 with the cutter ring may be driven forward into the open parison as soon as the mold is closed, and the bottle may subsequently be blown.

Figure 2:
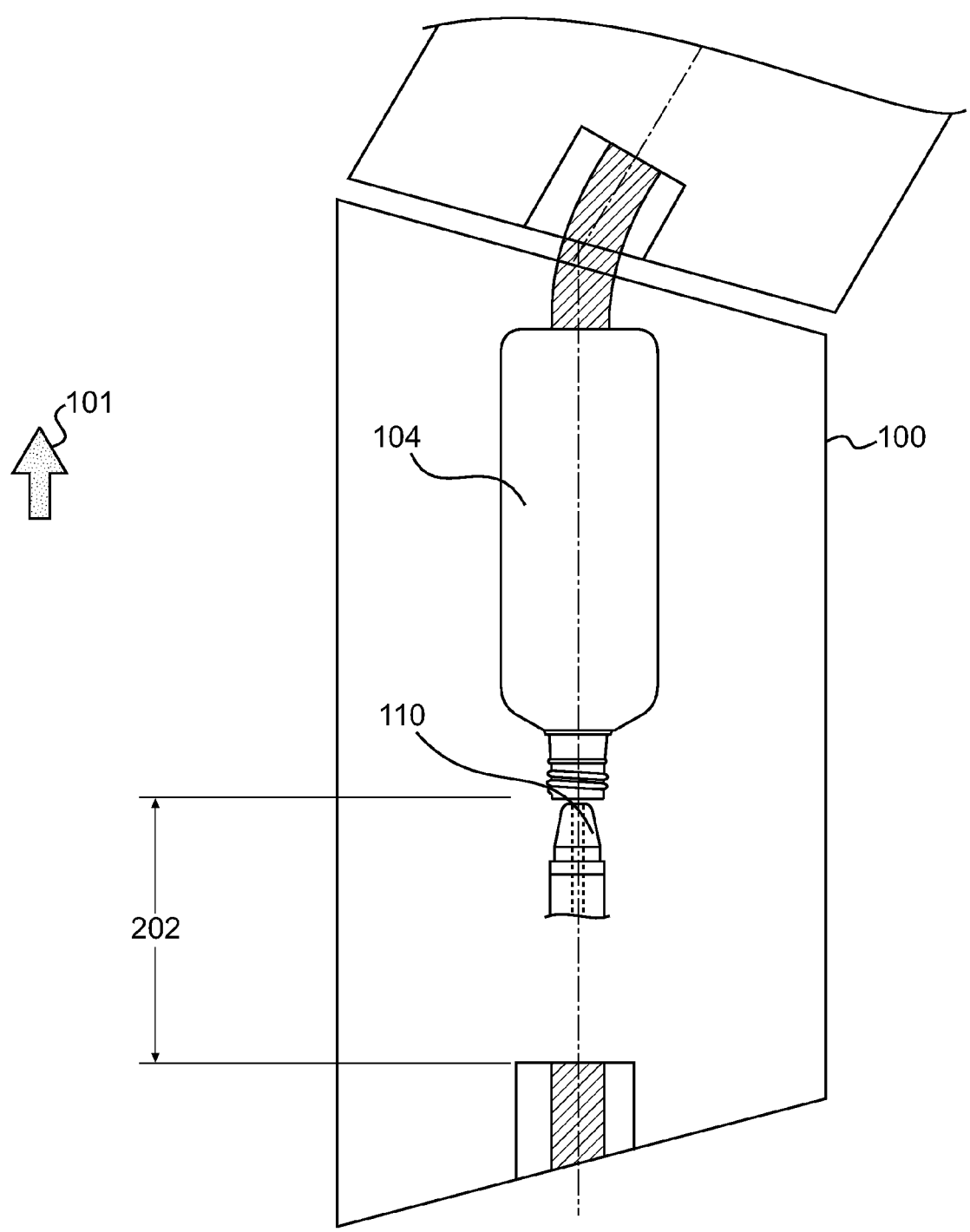
FIG. 2 depicts an exemplary embodiment of the mold in a continuous extrusion blow molder according to the present invention.

FIG. 2 illustrates the mold 100 in use in a wheel blow molder: as discussed in U.S. application Ser. No. 11/125,112, the extrusion of the parison may be interrupted to prevent excess flash when the mold cavity does not fill the mold. For embodiments of the present invention, the parison may be programmed to be cut so that no parison is present in the parison gap region 202, which may be occupied by the blow pin tip 110 and air cylinder 112. The programming of the extrusion of the parison may be modified for this invention as compared to extrusion in conventional continuous extrusion processes.

Several factors may be considered in programming the parison. First, head tooling angles on the flowhead may be more obtuse than with standard tooling, which may be necessary for shorter travel for cutoff. Second, the container in the mold may be upside down with respect to conventional operation, i.e., the container is blown neck down with respect to the direction of travel of the mold. Third, precise cutoff of the parison may have to be programmed. Fourth, container weight balance may be critical. The thickness of the parison is controlled by the programming, so the weight balance of the container can be controlled. Fifth, the ends of the parison contract somewhat elastically after cutoff. The contraction amount may be considered when programming at what length to cut the parison.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A mold for use in a wheel blow-molding device, the mold comprising:
   a first half and a second half, each half having a rotation direction and a transverse direction perpendicular to the rotation direction, each half having a container-shaped cavity, adapted to receive a parison, wherein the cavity has a body portion and a neck portion;
   a blow pin tip disposed in the mold, adapted to be inserted into an open end of the parison in the neck portion of the cavity, the blow pin tip being adapted to blow a gas into the parison to blow mold a container; further comprising a blow air cylinder coupled to the blow pin tip; and wherein the blow air cylinder is disposed inside of the mold.

2. The mold of claim 1, wherein the neck portion of the cavity is disposed behind the body portion in the direction of rotation.

3. The mold of claim 1, further comprising a neck insert disposed around the neck portion, adapted to shape the parison in the neck portion into a container neck.

4. The mold of claim 1, further comprising a striker plate disposed to contact an open end of the neck portion.

5. The mold of claim 1, further comprising a cutting ring disposed behind the striker plate, and moveable into the neck portion, adapted to cut excess parison material from a formed container neck.

6. The mold of claim 1, further comprising a blow air cylinder coupled to the blow pin tip.

7. A mold for use in a wheel blow-molding device, the mold comprising:
   a first half and a second half, each half having a rotation direction and a transverse direction perpendicular to the rotation direction, each half having a container-shaped cavity, adapted to receive a parison, wherein the cavity has a body portion and a neck portion;
   a blow pin tip disposed in the mold, adapted to be inserted into an open end of the parison in the neck portion of the cavity, the blow pin tip being adapted to blow a gas into the parison to blow mold a container; further comprising a blow air cylinder coupled to the blow pin tip; and further comprising a second blow air cylinder adapted to transport the blow pin tip in the transverse direction to a blowing position.

8. The mold of claim 7, wherein the blow air cylinder is external to the mold.

9. A method of molding a container in a wheel blow-molding device, the method comprising, closing a mold around an extruded parison, the mold comprising:
   a first half and a second half, each half having a rotation direction and a transverse direction perpendicular to the rotation direction, each half having a container-shaped cavity, adapted to receive a parison, wherein the cavity has a body portion and a neck portion;
   a blow pin tip disposed in the mold; inserting the blow pin tip into an open end of the parison in the neck portion of the cavity; and blowing a gas into the parison with the blow pin tip; and wherein the neck portion of the cavity is disposed behind the body portion in the direction of rotation.

10. The method of claim 9, further comprising shaping the parison in the neck portion into a container neck with a neck insert disposed around the neck portion.

11. The method of claim 9, further comprising contacting an open end of the neck portion with a striker plate.

12. The method of claim 9, further comprising cuffing excess parison material from a formed container neck with a cuffing ring disposed behind the striker plate, and moveable into the neck portion.

13. The method of claim 9, further comprising a blow air cylinder coupled to the blow pin tip.

14. The method of claim 13, wherein the blow air cylinder is disposed inside of the mold.

15. The method of claim 13, wherein the blow air cylinder is external to the mold.

16. The method of claim 13, further comprising transporting the blow pin tip in the transverse direction to a blowing position with a second blow air cylinder.

17. The mold of claim 7, wherein the neck portion of the cavity is disposed behind the body portion in the direction of rotation.

18. The mold of claim 7, further comprising a neck insert disposed around the neck portion, adapted to shape the parison in the neck portion into a container neck.

19. The mold of claim 7, further comprising a striker plate disposed to contact an open end of the neck portion.

20. The mold of claim 7, further comprising a cutting ring disposed behind the striker plate, and moveable into the neck portion, adapted to cut excess patison material from a formed container neck.

* * * * *